(12) United States Patent  
Dorn et al.

(10) Patent No.: US 7,373,611 B2  
(45) Date of Patent: May 13, 2008

(54) METHOD AND COMPUTER PROGRAM FOR INTEGRATING A BASIC PROGRAM WITH A BASIC PROGRAM WINDOW INTO AN AUXILIARY PROGRAM WITH AN AUXILIARY WINDOW

(75) Inventors: Karlheinz Dorn, Kalchreuth (DE); Michael Peter, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 758 days.

(21) Appl. No.: 10/423,650

(22) Filed: Apr. 25, 2003

(65) Prior Publication Data

US 2004/0027386 A1 Feb. 12, 2004

(30) Foreign Application Priority Data

Apr. 26, 2002 (DE) ................ 102 18 892

(51) Int. Cl.
*G09G 5/00* (2006.01)
(52) U.S. Cl. ................ 715/781; 719/310
(58) Field of Classification Search ........ 715/781, 715/310; 345/781; 719/310
See application file for complete search history.

(56) References Cited

U.S. PATENT DOCUMENTS 5,179,655 A 1/1993 Noguchi et al.
5,263,134 A 11/1993 Paal et al.
5,499,327 A * 3/1996 Satoh ................... 345/634
5,522,025 A * 5/1996 Rosenstein ............. 715/807
5,838,906 A * 11/1998 Doyle et al. ........... 715/501.1

FOREIGN PATENT DOCUMENTS

EP 0 490 595 5/1998

\* cited by examiner

*Primary Examiner*—Kristine Kincaid
*Assistant Examiner*—Chris Watt
(74) *Attorney, Agent, or Firm*—Schiff Hardin LLP

(57) ABSTRACT

At least one basic program and an auxiliary program run on a computer and collaborate with the computer via an operating system, with windows being displayed on a viewing device allocated to the computer. The auxiliary program determines a basic window pointer on the basis of an identifier that is characteristic of the at least one basic program, the location and size of the basic window on the viewing device being able to be set via the basic window pointer. The auxiliary program, based on this pointer, sets the location and size of the basic window to values determined by the auxiliary program.

14 Claims, 5 Drawing Sheets

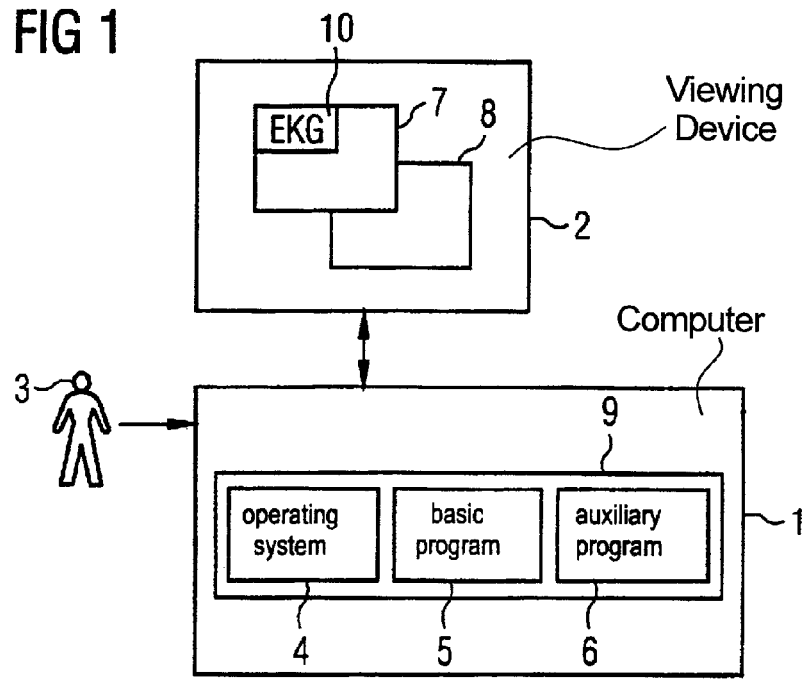
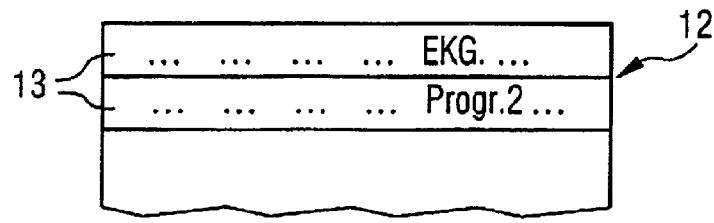
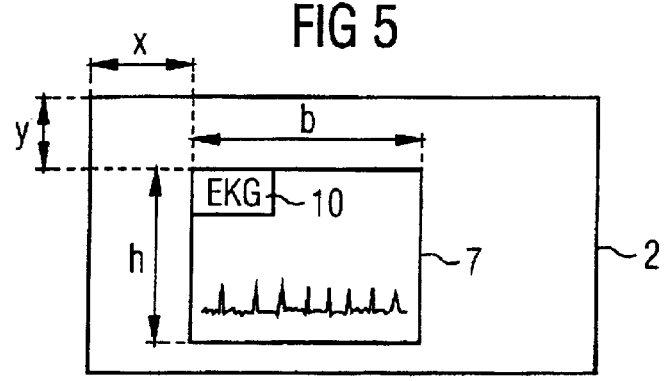

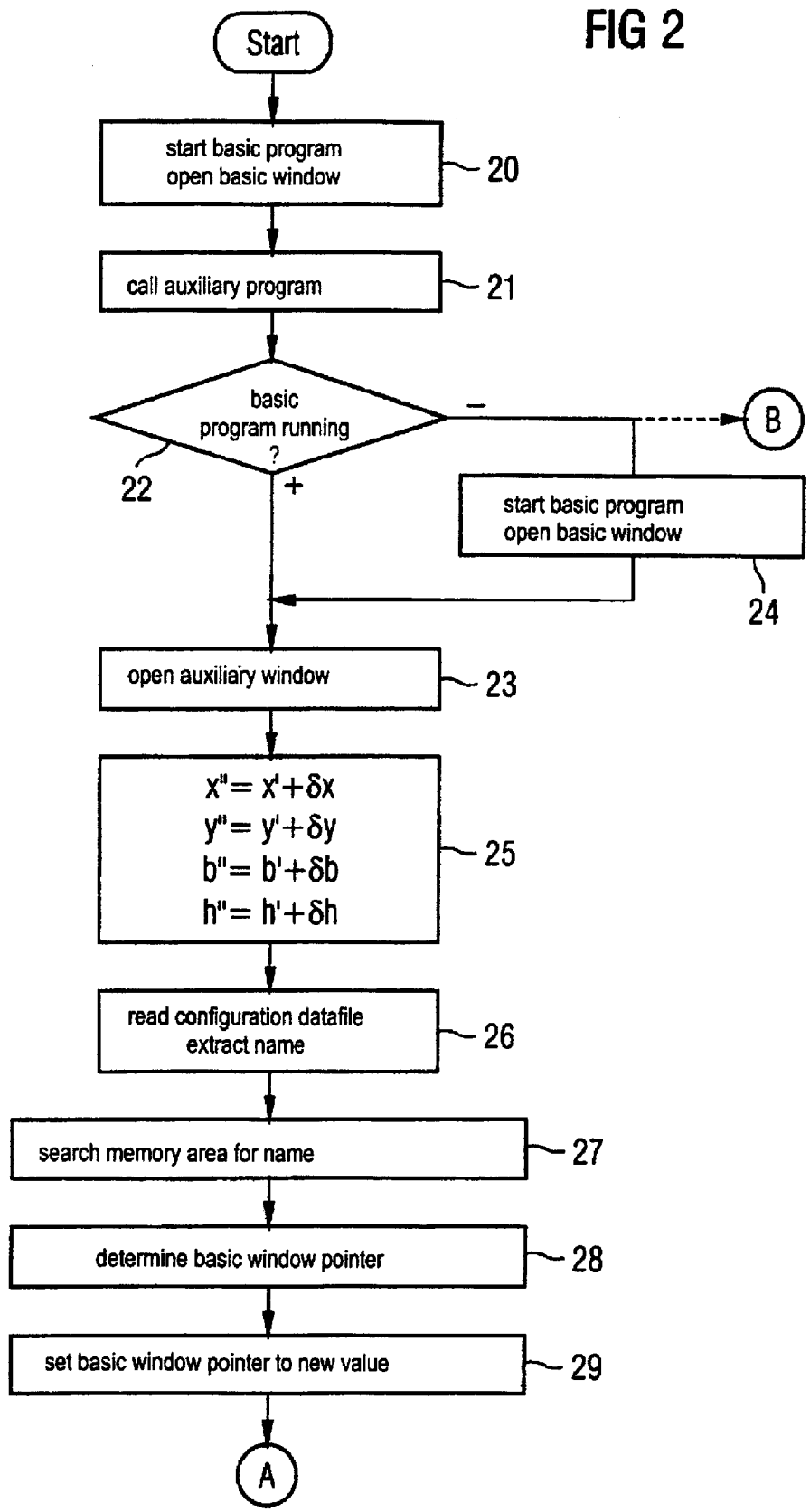

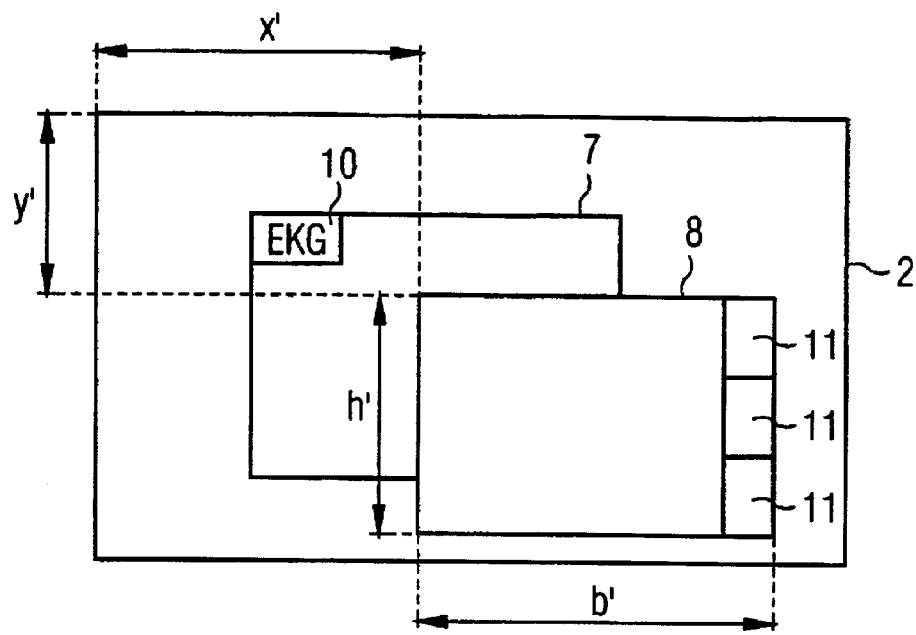
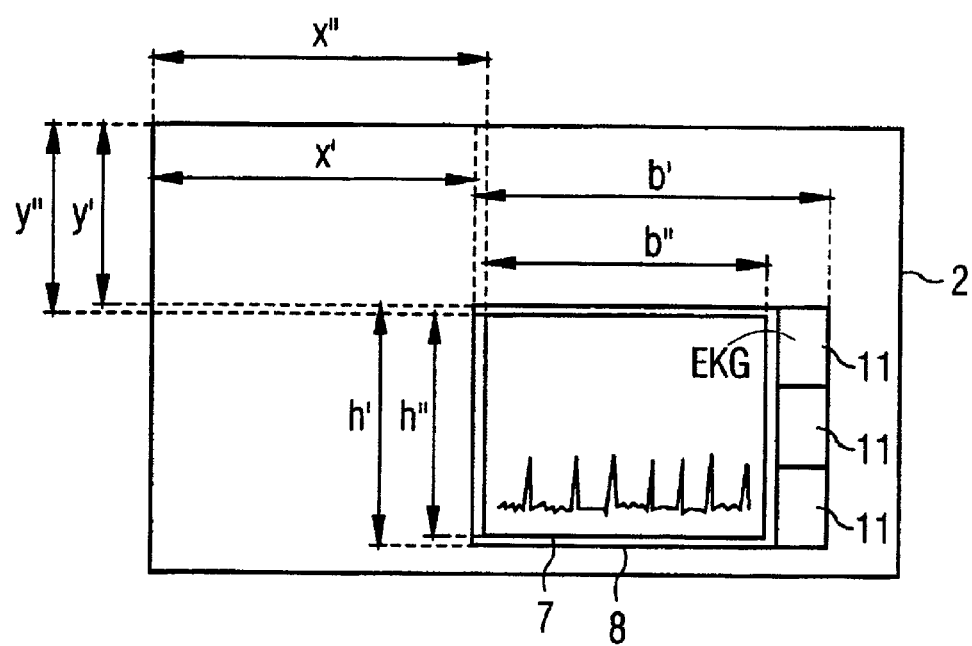

METHOD AND COMPUTER PROGRAM FOR INTEGRATING A BASIC PROGRAM WITH A BASIC PROGRAM WINDOW INTO AN AUXILIARY PROGRAM WITH AN AUXILIARY WINDOW

BACKGROUND OF THE INVENTION

1. Field of the Invention

The present invention is directed to an integration method for at least one basic program with a basic window into an auxiliary program with an auxiliary window, of the type wherein the at least one basic program and the auxiliary program run on the computer and collaborate with the computer via an operating system, and wherein the basic window and the auxiliary window can be displayed on a viewing device allocated to the computer.

2. Description of the Prior Art

In many instances, there is a necessity in computer systems for an application program to be integrated into another application program, so that both programs can run separately from one another but one program is visually dominant over the other program. The other program thus should be integrated into the one program in this case. The two programs should have a so-called father-child relationship to one another.

Conventionally, the program to be integrated is produced according to a given visual standard for this purpose. The program can be integrated only as a result of this standard. If the program is not produced according to the given visual standard, it cannot really run visually integrated but must be displayed on the user interface, or the viewing device, as a separate program in a separate visual window.

SUMMARY OF THE INVENTION

An object of the present invention is to provide an integration method with which a basic program—regardless of its design—can be integrated into an auxiliary program.

This object is achieved in a method and computer program wherein the auxiliary program determines a basic window pointer on the basis of an identifier that is characteristic of the at least one basic program, the location and size of the basic window on the viewing device being able to be set via this basic window pointer, and wherein that the auxiliary program, based on the basic window pointer, sets the location and size of the basic window on the viewing device to values determined by the auxiliary program.

As a result, the two programs run completely independently of one another. Only the location and size of the basic window on the viewing device are determined by the auxiliary program. In its visual integration into the auxiliary program, in contrast, the basic program enters into no coupling whatsoever with the auxiliary program.

The inventive method and program yield a number of advantages.

First, the basic program that is to be integrated into the auxiliary program need not be subjected to any specific design criteria. Any arbitrary basic program can be integrated. In particular, completely normal, independently runnable executables with user interface can be utilized as the basic program.

Further, the basic program can continue to run even given a planned or unplanned termination of the auxiliary program. It is thus not bound to the processing of the auxiliary program. In particular, the basic program can be "mission critical". One example of such a mission critical program is a medical application, for example for acquiring an electrocardiogram.

The basic program can already be processed by the computer when the auxiliary program starts. It is also possible, however to delay the start of the auxiliary program, when the auxiliary program is called, until the start of the at least one basic program has ensued.

The basic program can be permanently prescribed for the auxiliary program. Preferably, however, it is only prescribed for the auxiliary program at the run time.

A fixed prescription as well as a prescription at the run time of the auxiliary program can ensue, for example, by means of a configuration datafile that contains the identifier characteristic of the at least one basic program.

The identifier can be of an arbitrary nature as long as the basic program can be identified by means of the identifier. Preferably, however, the identifier is a name under which the basic window is displayed on the viewing device.

Fundamentally, the location and size of the basic window on the viewing device can be arbitrarily set by the auxiliary program. Preferably, however, they are set to values that are dependent on the location and size of the auxiliary window on the viewing device. In particular, the values can be determined from the location and size of the auxiliary window on the viewing device by adding corresponding offsets.

If the location and size of the auxiliary window on the viewing device are modified, location and size of the basic window on the viewing device preferably are also re-determined by the auxiliary program.

As mentioned, the at least one basic program can continue to be processed given a termination of the auxiliary program. It is thus possible for the at least one basic program not to be terminated given a termination of the auxiliary program. It is alternatively possible for the location and size of the basic window on the viewing device to be reset to the values established before the determination by the auxiliary program or for the location and size of the basic window on the viewing device are retained.

DESCRIPTION OF THE DRAWINGS

FIG. 1 is a block diagram showing a basic configuration of a computer operable according to the inventive method and program.

FIGS. 2 and 3 in combination are a flowchart for the inventive method and program.

FIG. 4 is a configuration datafile for use in the inventive method and program.

FIGS. 5-9, respectively illustrate presentations on a viewing device allocated to the computer as occur in accordance with the inventive method and program.

DESCRIPTION OF THE PREFERRED EMBODIMENTS

Figure 3:
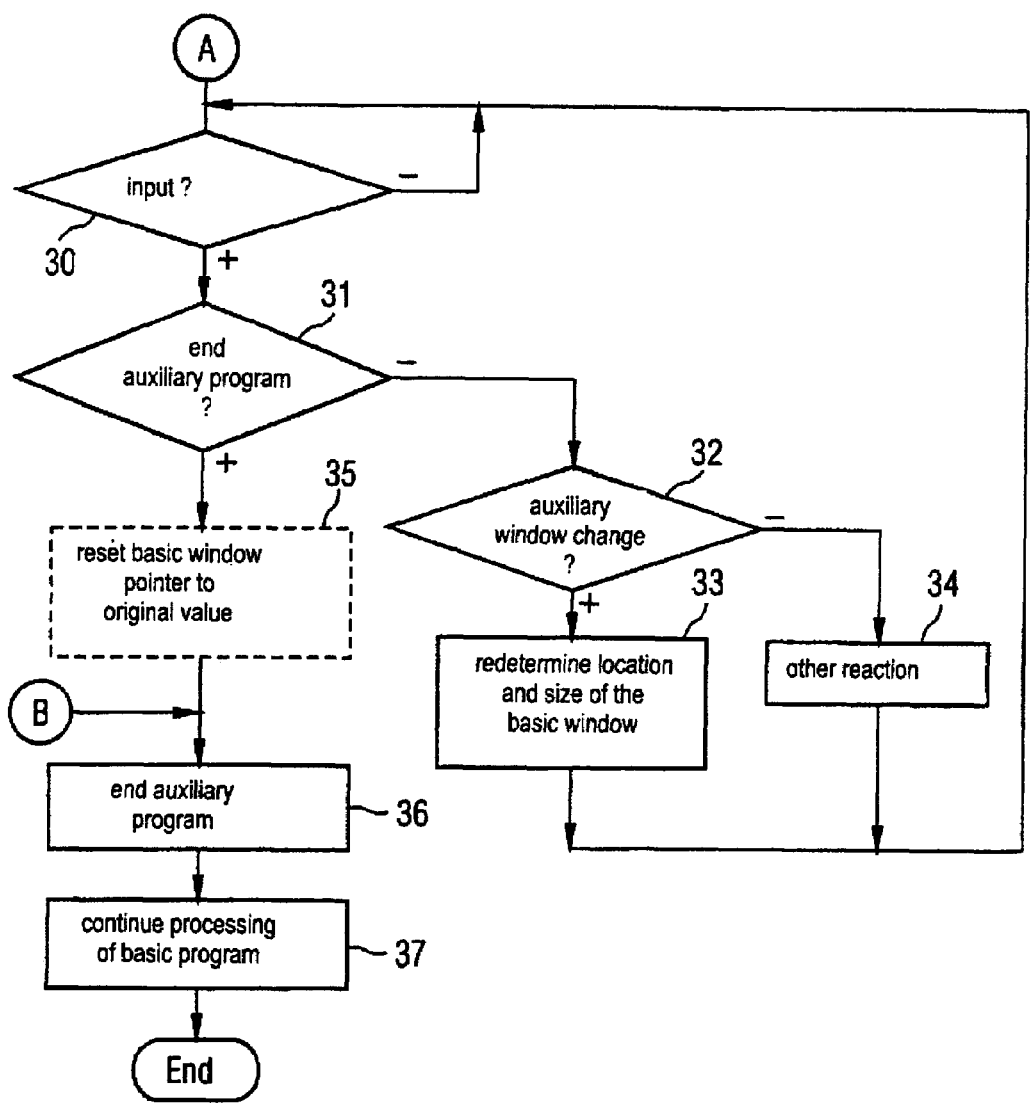

As shown in FIG. 1, a viewing device 2 is allocated to a computer 1 (shown only schematically). Outputs to a user 3 are provided via the viewing device 2. The viewing device 2 can be fashioned, for example, as a monitor or as a flat picture screen.

The computer 1 operates under the control of a window-based operating system 4. The window-oriented operating system 4 can, for example, Microsoft Windows®. The computer 1 also can process a basic program 5 and an auxiliary program 6 the outputs of which can be displayed via a basic window 7 allocated to the basic program 5 and an auxiliary window 8 allocated to the auxiliary program 6. The basic program 5 and the auxiliary program 6, thus, can run on the computer 1. They collaborate with the computer 1 via the operating system 4.

The computer 1 is able to quasi-simultaneously process the basic program 5 and the auxiliary program 6 (in the sense of a multi-tasking mode). In particular, the auxiliary program 6 is fashioned as a computer program product that is stored in a bulk storage 9 of the computer 1. The auxiliary program 6 contains an integration method (explained in detail below) with which the basic program 5 can be visually subordinated to the auxiliary program 6.

As shown in FIG. 2, the basic program 5 usually is started first in a step 20. When starting the basic program 5, the basic window 7 is opened on the viewing device 2—see FIG. 5. The basic window 7 is described by a coordinate pair x, y, and by a width b and a height h. The coordinate pair x, y defines the location at which the basic window 7 is presented, and the width b and the height h define the size with which the basic window is presented on the display device 2. For example, a cardiac waveform a (EKG) is presented in the basic window 7, this being made available to the basic program 5 via a known measuring instrument (not shown). The basic program 5 in this example is thus a medical application program.

Such a measurement must be able to continue running independently of whatever other programs are running on the computer 1 and, in particular, independently of whether these programs are running properly or are aborted, for example with special commands or due to errors. In the present case, thus, the basic program 5 is also a mission critical program.

In order to allow the user 3 to allocate the basic program 5 to the basic window 7, a name with which the user 3 can undertake a suitable allocation is displayed in a name field 10 at the upper left-hand edge of the basic window 7. According to FIG. 5, the applicable medical abbreviation "EKG" is displayed in the name field 10.

After starting the basic program 5 and opening the basic window 7 in step 20, the auxiliary program 6 is called in a step 21. When the auxiliary program 6 is called, in a check is initially made in a step 22 to determine whether the basic program 5 has already started. A step 23 follows only if the basic program 5 has already started. Otherwise a step 24 corresponding with the step 20 is executed before the processing the step 23. Alternatively, a branch can also be made to a step 36.

The auxiliary window 8 is opened in step 23—see FIG. 6. The location and size of the auxiliary window 8 are in turn defined by a coordinate pair x', y' as well as by a width b' and a height h'. According to FIG. 6, the auxiliary window 8 is essentially empty at first, and merely includes a number of buttons 11 at a lateral edge—the right lateral edge in this example. This shall be discussed later.

In a step 25, new values x", y", b", h" are then determined with which the basic window 7 is to be presented on the viewing device 2. In particular, the values x", y", b", h" can depend on the corresponding values x', y', b', h' for the auxiliary window 8. The following can apply:

$$x''=x'+\delta x \quad (1)$$

$$y''=y'+\delta y \quad (2)$$

$$b''=b'+\delta b \quad (3)$$

$$h''=h'+\delta h \quad (4).$$

The location and size of the auxiliary window 7 thus can be determined from the location and size of the auxiliary window 8 by adding corresponding offsets δx, δy, δb, δh. The offsets δx, δy are greater than zero. The offset δb is less than zero but greater in magnitude than the offset δx. Analogously, the offset δh is less than zero but greater in magnitude than the offset δy. If the basic windows were presented on the viewing device 2 with the values x", y", b", h", the basic window 5 would therefore be arranged within the auxiliary window 8.

In a step 26, the auxiliary program 6 then reads a configuration datafile 12 that, according to FIG. 4, contains at least one line 13. A program that is to be integrated into the auxiliary program 6 is described in each line 13. The programs to be integrated, thus, are not prescribed for the auxiliary program 6 until the run time of the auxiliary program 6.

According to the first line 13, the basic program 5 should be integrated into the auxiliary program 6. This line contains the abbreviation "EKG", i.e. the name under which the basic window 7 is displayed on the viewing device 2. This name is an identifier that is characteristic of the basic program 5.

Likewise in step 26, the auxiliary program 6 extracts the above-described identifier from line 13, the abbreviation "EKG" in this case. In a step 27, the auxiliary program 6 then searches a memory area that contains internal operating system data about the running programs 5, 6 and their allocated windows 7, 8 for the occurrence of the identifier, i.e., the name "EKG". The memory area, and where in this memory area, a basic window pointer 7 is stored, via which the location and size of the basic window 7 can be set, thus can be determined on the basis of this name. In a step 28, the auxiliary program 6 locates this basic window pointer on the basis of the characteristic identifier "EKG". As a rule, the basic window pointer points to a memory area in which the coordinate pair x, y, the width b and the height h of the basic window 7 are stored.

In a step 29, attributes of the basic window pointer are set to a value with which it points to a further memory area wherein the values x", y", b", h" determined by the auxiliary program 6 in the step 25 are stored. As a result thereof, the basic window 7 is shifted and scaled on the viewing device 2. The auxiliary program 6 thus sets the location and size of the basic window 7 to values x", y", b", h" that are defined by it. FIG. 7 shows the presentation on the viewing device 2 that arises as a result. Further, it places the name ("EKG" here) of the basic program 5 into one of the buttons 11.

According to FIG. 3, a query is now made in a step 30 as to whether an input by the user 3 ensued. The step 30 is repeatedly processed until an input ensues.

Figure 8:
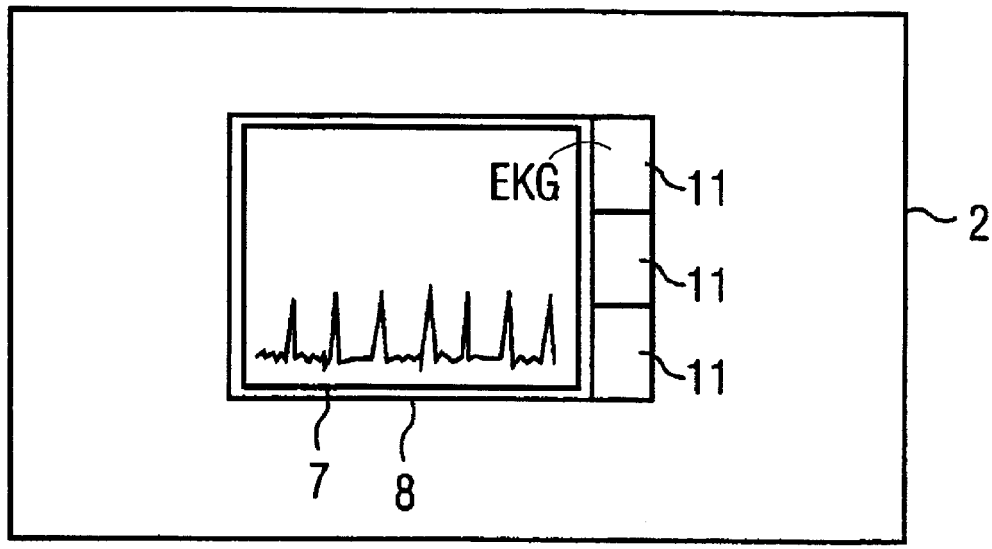
Figure 9:
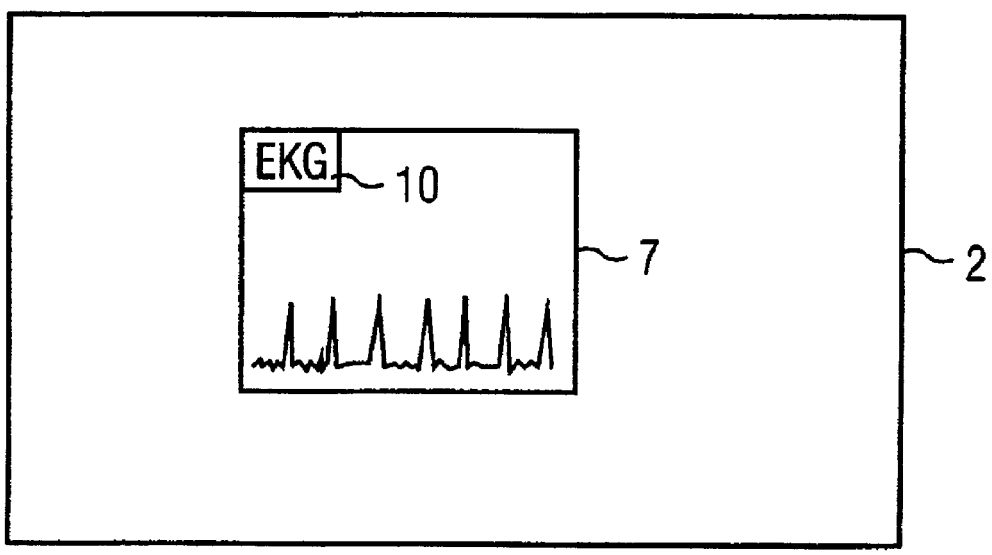

When an input ensues, a check is first carried out in a step 31 as to whether the input was a command to end the auxiliary program 6. If the input was not a command for ending the auxiliary program 6, a query is made in a step 32 as to whether the input was a modification of the location and size of the auxiliary window 8. If this is the case, the location and size of the basic window 7 are re-determined by the auxiliary program 6 in a step 33. This is shown as an example in FIG. 8. An adaptation of the basic window 7 to the auxiliary window 8 thus always ensues. Otherwise, i.e. when a modification of the location and size of the auxiliary window 8 on the viewing device 2 did not ensue, the corresponding (other) input is processed in a step 34.

If a decision was made in step 31 that the auxiliary program 6 should be terminated, then the auxiliary program 6 is terminated in step 37. The processing of the basic program 5, however, is continued in step 37. The basic 5 thus is not terminated given a termination of the auxiliary program 6.

According to FIG. 3, the auxiliary program 6 ends in step 36 without further measures. In particular, the location and size of the basic window 7 are thus retained unmodified. Given a termination of the auxiliary program 6, thus, the basic window 7 is presented on the viewing device 2 at the same location and with the same size with which it was most recently presented during the running of the auxiliary program 6. Alternatively, however, it would also be possible—as indicated with broken lines in FIG. 3—to reset the basic window pointer to its original value in a step 35 that is executed immediately before the step 36, so that the location and size of the basic window 7 are reset upon termination of the auxiliary program 6 to values that the basic window 7 had before being defined by the auxiliary program 6.

The above discussion describes how a single basic program 5 can be integrated into the auxiliary program 6. The auxiliary program 6, however, can administer a separate window for each button 11. It is thus possible to display a respective window on a task card for each button 11. The task cards and the windows allocated to these task cards usually exhibit identical sizes. A particular basic window 7 thus can be tacked to such a task card and be displayed in the foreground by actuating the appropriate button 11. The priority of the basic window 7 thus is also dynamically coupled to that of the respective task card. The switching between individual task cards is well known and need not be discussed in greater detail.

The inventive integration of the basic program 5 into the auxiliary program 6 thus enables an integration of a—basically arbitrary —number of basic programs 5, particularly mission critical basic programs 5 as well, into the auxiliary program 6 in a simple way. Normal programs thus can be introduced unmodified into an ordered, task card-like workflow.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for integrating at least one basic program with a basic window into an auxiliary program with an auxiliary window, comprising the steps of:
   running a plurality of programs, including at least one basic program, having a basic window, and an auxiliary program, having an auxiliary window, independently of each other on a computer having an associated viewing device on which said basic window and said auxiliary window are displayable, and allowing said at least one basic program to continue to run on said computer if running of said auxiliary program on said computer is terminated;
   in said auxiliary program, searching a memory area associated with said computer containing internal operating system data describing said plurality of programs, for an occurrence of an identifier that is characteristic of said at least one basic program, and determining a location of a basic window pointer from a location in said memory area where said identifier occurs, said basic window pointer allowing a location and a size of said basic window on said viewing device to be set; and
   using said basic window pointer, setting said location and size of said basic window on said viewing device, in said auxiliary program, to values determined by said auxiliary program.

2. A method as claimed in claim 1 comprising the step of, upon calling said auxiliary program in said computer, delaying a start of said auxiliary program until said at least one basic program is started.

3. A method as claimed in claim 1 comprising prescribing said at least one basic program for said auxiliary program during a running time of said auxiliary program in said computer.

4. A method as claimed in claim 1 comprising prescribing said at least one basic program for said auxiliary program by a configuration data file, accessible by said computer, containing said identifier.

5. A method as claimed in claim 1 comprising employing as said identifier, a name under which said basic window is displayed on said viewing device.

6. A method as claimed in claim 1 comprising setting said location and said size of said basic window on said viewing device in said auxiliary program to values that are dependent on a location and size of said auxiliary window on said viewing device.

7. A method as claimed in claim 6 comprising determining, in said auxiliary program, the location of said basic window from the location of said auxiliary window by adding a location offset to the location of said auxiliary window, and determining the size of said basic window in said auxiliary program by adding a size offset to the size of said auxiliary window.

8. A method as claimed in claim 6 comprising modifying the location and size of said auxiliary window on said viewing device to a modified location and size of said auxiliary window, and automatically in said auxiliary program re-determining the location and size of said basic window in said viewing device dependent on said modified location and size of said auxiliary window.

9. A method as claimed in claim 1 comprising upon termination of running of said auxiliary program in said computer, resetting the location and size of said basic window on said viewing device to values for said location and size of said basic window existing before said location and size of said basic window were determined by said auxiliary program.

10. A method as claimed in claim 1 comprising, upon termination of running of said auxiliary program in said computer, retaining the location and size of said basic window on the viewing device that were determined by said auxiliary program.

11. A method as claimed in claim 1 comprising employing a mission critical program as said at least one basic program.

12. A method as claimed in claim 1 comprising employing a medical application program as said at least one basic program.

13. A computer-readable medium encoded with a data structure for integrating at least one basic program with a basic window into an auxiliary program with an auxiliary window, said data structure, when said medium is loaded in a computer, causing the computer to:
   run a plurality of programs including at least one basic program, having a basic window, and an auxiliary program, having an auxiliary window, independently of each other, with said basic window and said auxiliary window being displayable on said viewing device, and allow said at least one basic program to continue to run on said computer if running of said auxiliary program on said computer is terminated;

in said auxiliary program search a memory area associated with said computer containing internal operating system data describing said plurality of programs, for an occurrence of an identifier that is characteristic of said at least one basic program, and, to determine a location of a basic window pointer from a location in said memory area where said identifier occurs identifier, said basic window pointer allowing a location and a size of said basic window on said viewing device to be set; and using said basic window pointer, to set said location and size of said basic window on said viewing device, in said auxiliary program, to values determined by said auxiliary program.

14. A computer operable to integrate at least one basic program with a basic window into an auxiliary program with an auxiliary window, comprising:

an operating system programmed to run a plurality of programs including at least one basic program, having a basic window, and an auxiliary program, having an auxiliary window, independently of each other, and to allow said at least one basic program to continue to run on said computer if running of said auxiliary program on said computer is terminated;

a viewing device connected to said operating system on which said basic window and said auxiliary window are displayable;

said operating system being programmed to, in said auxiliary program, search a memory area associated with said computer containing internal operating system data describing said plurality of programs, for an occurrence of an identifier that is characteristic of said at least one basic program, and, to determine a location of a basic window pointer from a location in said memory area where said identifier occurs identifier that is characteristic of said at least one basic program, said basic window pointer allowing a location and a size of said basic window on said viewing device to be set; and said operating system being programmed to, using said basic window pointer, set said location and size of said basic window on said viewing device, in said auxiliary program, to values determined by said auxiliary program.

* * * * *